(12) United States Patent
Hart et al.

(10) Patent No.: US 6,660,316 B2
(45) Date of Patent: Dec. 9, 2003

(54) PACKAGED CANDY PRODUCT

(75) Inventors: Daniel G. Hart, Hermosa Beach, CA (US); Gary D. Weiss, San Pedro, CA (US)

(73) Assignee: The Topps Company, Inc., New York, NY (US)

( * ) Notice: Subject to any disclaimer, the term of this patent is extended or adjusted under 35 U.S.C. 154(b) by 0 days.

(21) Appl. No.: 10/027,521

(22) Filed: Dec. 20, 2001

(65) Prior Publication Data

US 2003/0118700 A1 Jun. 26, 2003

(51) Int. Cl.[7] .............................. B65D 1/04; A23G 3/20
(52) U.S. Cl. ....................... 426/115; 426/104; 426/110; 426/112; 426/120; 426/134; 215/6; 206/219
(58) Field of Search ............................. 426/90, 91, 104, 426/110, 112, 115, 117, 134, 120; 216/5; 206/219, 221

(56) References Cited

U.S. PATENT DOCUMENTS

| | | | | |
|---|---|---|---|---|
| 3,326,358 A | * | 6/1967 | Singleton | |
| 5,209,565 A | * | 5/1993 | Goncalves | 366/130 |
| 5,324,527 A | | 6/1994 | Coleman | 426/134 |
| 5,370,884 A | | 12/1994 | Coleman | 426/112 |
| 5,993,870 A | | 11/1999 | Hoeting et al. | 426/110 |
| 6,187,350 B1 | * | 2/2001 | Gallart et al. | 426/91 |
| 6,187,352 B1 | | 2/2001 | Crosbie | 426/104 |
| 6,289,906 B1 | | 9/2001 | Vanden Dries et al. | 134/117 |

FOREIGN PATENT DOCUMENTS

| | | | | |
|---|---|---|---|---|
| GB | 2 297 306 | | 7/1996 | ............ B65D/1/04 |
| WO | WO 00/19803 | | 4/2000 | |

OTHER PUBLICATIONS

International Search Report

* cited by examiner

Primary Examiner—Steve Weinstein
Assistant Examiner—Robert Madsen
(74) Attorney, Agent, or Firm—Darby & Darby

(57) ABSTRACT

A candy product comprises a plastic housing which defines upper and lower chambers. A candy holder retains a piece of hard candy and can be placed in the lower chamber of the housing to close the chamber. A compressible bottle is retained within the upper chamber and is accessible to a user through openings in the side walls. The bottle includes a nipple which extends through the top of the housing. In use, the candy is removed from the lower chamber, the housing is inverted, and pressure is applied to the bottle to expel the flavored liquid onto the candy.

6 Claims, 2 Drawing Sheets

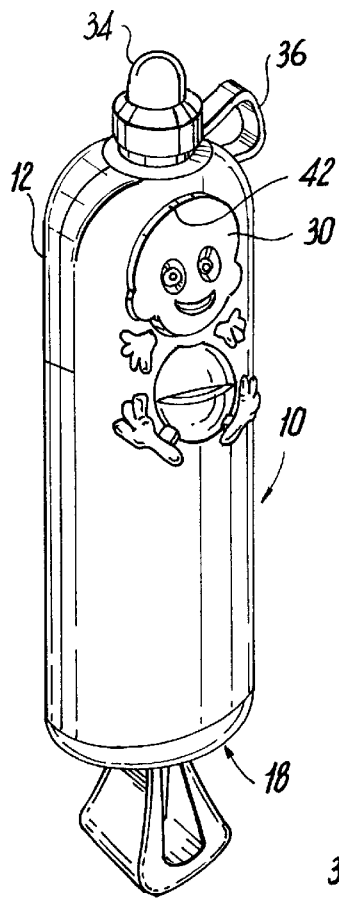
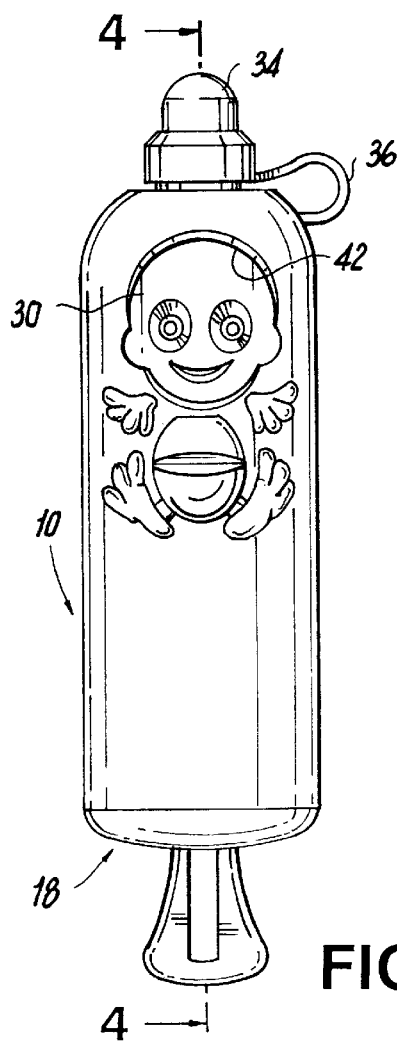
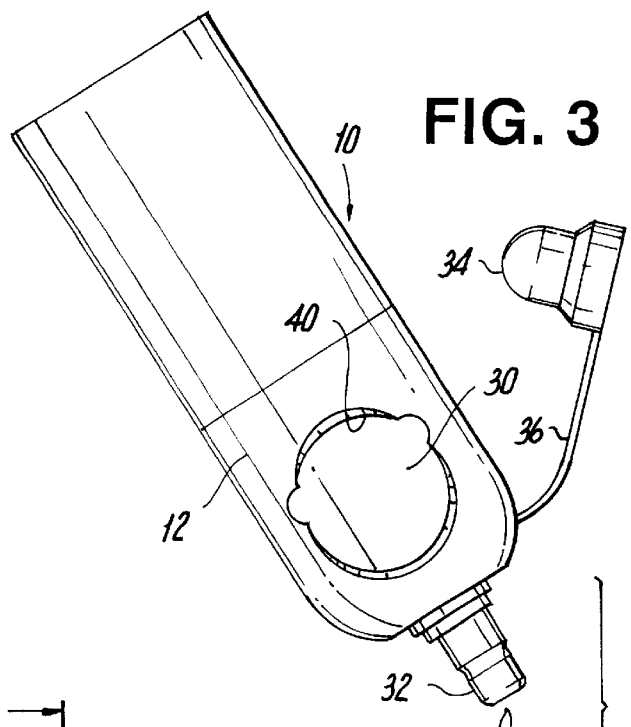
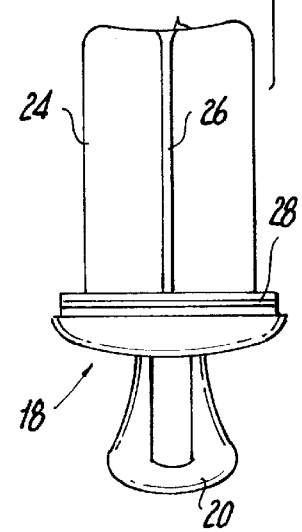
FIG. 1
FIG. 2
FIG. 3

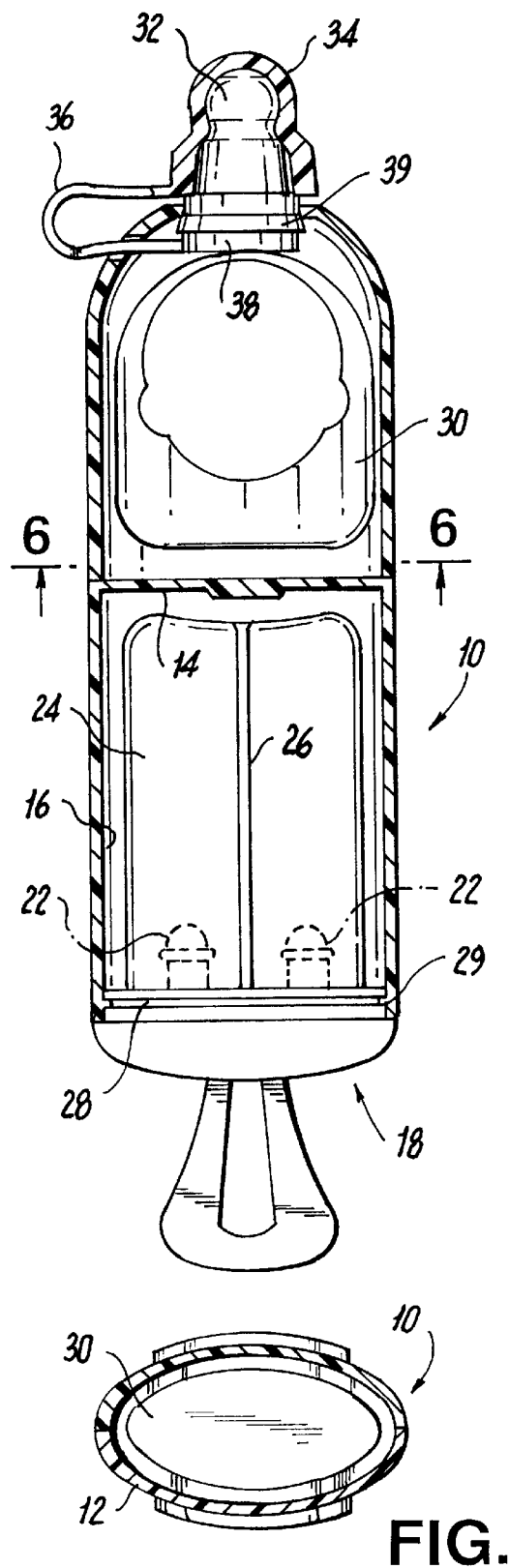

PACKAGED CANDY PRODUCT

BACKGROUND OF THE INVENTION

This invention relates to a candy product which comprises a device for holding a piece of candy, such as a lollipop, and for dispensing a stream of flavored liquid droplets onto the candy to create a pleasing taste sensation.

Various devices exist which combine a candy product with a liquid dispenser in which the candy and liquid are consumed together. The addition of liquid allows a consumer to adjust the taste of the candy to his or her preference by dispensing varying amounts of liquid onto the candy, thereby altering its flavor.

U.S. Pat. No. 5,324,527 to Coleman discloses a device which dispenses liquid from a reservoir onto a candy product. The liquid is dispensed by applying a squeezing force to the liquid reservoir, or by applying a rotary force to a threaded shaft, forcing the liquid onto the candy via channels in the candy.

U.S. Pat. No. 6,187,352 to Crosbie discloses a device which dispenses liquid from a reservoir via a spray mechanism. The liquid is sprayed directly into the mouth of a consumer to provide a cooling effect after consuming hot-flavored candy.

SUMMARY OF THE INVENTION

Briefly, a candy product according to the invention comprises a housing having separate chambers for holding a piece of hard candy and a compressible juice bottle containing a flavored liquid. The hard candy is secured to a candy holder which can be placed in the lower chamber of the housing and removed for consumption. The juice bottle is made of a pliable material which is accessible through openings in the housing so that an external squeezing force can be applied to the bottle to dispense liquid droplets onto the candy.

BRIEF DESCRIPTION OF THE DRAWINGS

FIG. 1 is a front perspective view showing a candy product in accordance with a preferred embodiment of the invention;

FIG. 2 is a front elevation of the candy product;

FIG. 3 is a rear elevation showing how the invention is used to apply liquid to hard candy;

FIG. 4 is a side sectional view along the line 4—4 of FIG. 2;

FIG. 5 is a sectional view along the line 5—5 of FIG. 4; and

FIG. 6 is a cross sectional view along the lines 6—6 of FIG. 5.

DESCRIPTION OF PREFERRED EMBODIMENTS

In accordance with the preferred embodiment of the invention, a two piece housing comprises a shell 10 and a rear cover 12. Shell 10 forms about three quarters of the housing and includes an internal shelf 14 (FIG. 5) which provides a lower compartment 16 that can be sealed. The bottom of shell 10 is open and receives a candy holder 18 comprising a handle 20 and two upstanding prongs 22.

The candy holder 18 is a molded plastic piece and supports hard candy 24 which is molded to the prongs 22 so that the caridy is retained on the holder 18. In the preferred embodiment, the candy 24 includes central channels 26 on each side to receive the liquid as described below.

Candy holder 18 includes a groove 28 which engages a corresponding rim 29 in the side wall of shell 10. The candy holder, in addition to supporting the hard candy, functions also to close the lower chamber 16. When the rib 29 is snap fit into groove 28 an almost air tight compartment is formed which helps prolong the shelf life of the hard candy.

A juice bottle 30 is mounted within the housing above shelf 14. An upstanding nipple 32 is friction fit into the neck of bottle 30 which is made of a compressible material so that liquid can be expelled from the bottle through, nipple 32 by compressing the bottle. The nipple may be closed by a cap 34 which is integrally formed with a retaining strap 36. The strap 36 includes a loop 38 at its opposite end which can be placed over the neck (not numbered) of the juice bottle 30 to hold the cap on the bottle. After the loop is attached to the neck of bottle 30, nipple 32 may be inserted into the bottle neck. Nipple 32, of course, directs the flow of liquid from the bottle 30 when it is squeezed and may include an enlarged diameter portion 39 overlying the strap loop 38 to retain the cap 34.

The upper portions of shell 10 and rear cover 12 include semicircular openings which can engage a complementary portion of the nipple 32 to retain the juice bottle 30 within the upper portion of the housing. The shell 10 and cover 12 include suitable slots so that the strap 36 can extend through the housing as shown in the drawings.

After the juice bottle is placed within the shell 10, the rear cover 12 is applied and secured to the contiguous surfaces of the shell 10 in any desired fashion, for example, adhesively.

The rear cover 12 includes an opening 40 and the shell 10 includes a front opening 42 (FIG. 3) so that the user can apply pressure to the juice bottle while it is retained within the housing. In a preferred embodiment, the openings are shaped like a face and the juice bottle 30 includes projecting portions which extend through the openings 40 and 42. If desired, one or both projecting portions of the juice bottle may be embossed to simulate a face as shown.

In use, the user removes the handle with candy 24 from the compartment 16. Cap 34 is then removed from nipple 32 and, as shown in FIG. 3, the housing is turned so that when the user applies pressure to bottle 30 through openings 40 and 42, the liquid within the bottle is expelled and dropped onto the candy.

Obviously, the invention can be used with any type of candy and any flavored liquid. In the preferred embodiment, the hardy candy is sweet and the liquid is a sour candy. The combination of the sweet and sour candy gives a delicious and satisfying taste. The child is easily able to control how sweet or how sour the taste of the candy will be.

We claim:

1. A packaged candy product, comprising:
   a housing including a front face and a back face, said housing defining an upper chamber and a lower chamber;
   a candy holder for supporting a piece of candy and including a handle at its lower end, said candy holder being receivable within said lower chamber to close the chamber and being selectively removable therefrom;
   a piece of hard candy supported by said candy holder;
   a compressible bottle within the upper chamber of said housing, said bottle containing a flavored liquid said bottle and said housing being configured to allow said liquid to be expelled from the bottle, at least two sides of said bottle being directly accessible through said housing such that a user can apply pressure directly to said bottle to dispense the flavored liquid on the hard candy when said hard candy supported on said candy holder has been removed from said housing.

2. A packaged candy product according to claim 1, wherein said housing includes opposed openings and said bottle includes portions extending through said openings.

3. A packaged candy product according to claim 2, wherein said bottle includes a nipple extending through the upper end of said housing.

4. A packaged candy product according to claim 3, wherein said housing includes two separate pieces, one of said pieces enclosing the entire lower chamber and a portion of the upper chamber, the remaining portion of the upper chamber being enclosed by the other piece.

5. A packaged candy product according to claim 1, wherein said candy has a double barrel cylindrical form.

6. A packaged candy product according to claim 2, wherein a least one of the portions of the bottle extending through the housing is shaped to resemble a face.

* * * * *